US011065946B2

(12) United States Patent
Dahlgren et al.

(10) Patent No.: US 11,065,946 B2
(45) Date of Patent: Jul. 20, 2021

(54) UTILITY VEHICLE HALF DOOR

(71) Applicant: DEERE & COMPANY, Moline, IL (US)

(72) Inventors: William R. Dahlgren, Mayville, WI (US); Krishna Deshma, Pune (IN)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 16/701,530

(22) Filed: Dec. 3, 2019

(65) Prior Publication Data

US 2021/0162842 A1 Jun. 3, 2021

(51) Int. Cl.

*B60J 5/00* (2006.01)
*B60J 5/04* (2006.01)
*E05D 3/02* (2006.01)

(52) U.S. Cl.

CPC .......... *B60J 5/0487* (2013.01); *B60J 5/0481* (2013.01); *E05D 3/02* (2013.01)

(58) Field of Classification Search

CPC .......... B60J 5/0487; B60J 5/0481; E05D 3/02
See application file for complete search history.

(56) References Cited

U.S. PATENT DOCUMENTS 2,359,712 A * 10/1944 Howie, Jr. .............. F25D 23/02 52/786.13
3,556,583 A 1/1971 Ellard
3,870,361 A * 3/1975 Krause ................ E05D 11/1042 296/146.11
4,273,378 A 6/1981 Kramer
4,529,244 A * 7/1985 Zaydel ................. B62D 29/048 24/289
4,766,025 A * 8/1988 Sanok ................ B29C 33/0044 249/142
4,882,842 A 11/1989 Basson et al.
5,125,716 A 6/1992 Smith et al.
5,359,795 A * 11/1994 Mawby .................. B29C 44/12 40/405
5,367,828 A 11/1994 Hashemnia
5,467,562 A * 11/1995 Holland ................. E04H 1/125 52/79.1
5,581,947 A 12/1996 Kowall et al.
5,829,195 A * 11/1998 Ojanen .................... B60J 1/085 49/166
5,857,732 A * 1/1999 Ritchie .................. B60J 5/0425 296/146.5
5,899,522 A * 5/1999 DeRees .................. B60J 5/0448 296/181.2
5,927,020 A * 7/1999 Kobrehel ........... B60R 13/0243 49/502
6,063,460 A * 5/2000 Souders ................ B29C 44/445 428/31
6,247,746 B1 6/2001 Brush
6,565,166 B1 * 5/2003 Bulk ...................... A47B 47/04 312/223.6
6,773,054 B2 8/2004 Martini
6,926,340 B2 8/2005 Moriyama (Continued)

*Primary Examiner* — Lori L Lyjak

(57) ABSTRACT

A utility vehicle half door includes a unitary molded plastic body that is symmetrical and identical on both a first surface and second surface. Hinge knuckles are integral with the unitary molded plastic body for hinged mounting to the left or right side of a utility vehicle. An interior panel subassembly with the door release handle and door latch may be attached to one of the first and second surfaces.

11 Claims, 3 Drawing Sheets

(56) References Cited

U.S. PATENT DOCUMENTS

| | | | | |
|---|---|---|---|---|
| 7,097,237 | B2 | 8/2006 | Weiner et al. | |
| 7,313,247 | B1 * | 12/2007 | Tilli | H04R 1/025 381/386 |
| 7,530,623 | B2 | 5/2009 | Hampel | |
| 7,988,210 | B2 | 8/2011 | Shibata et al. | |
| 8,459,724 | B2 | 6/2013 | Tsumiyama et al. | |
| 9,061,569 | B2 | 6/2015 | Spindler et al. | |
| 9,073,412 | B2 | 7/2015 | Dobrot et al. | |
| 9,724,984 | B2 | 8/2017 | Yamamoto | |
| 9,789,753 | B2 | 10/2017 | Yamamoto et al. | |
| 9,988,832 | B2 | 6/2018 | Hirneise | |
| 10,246,153 | B2 | 4/2019 | Deckard et al. | |
| 2003/0070768 | A1 * | 4/2003 | Lewis, Jr. | E06B 7/2301 160/92 |
| 2008/0106115 | A1 * | 5/2008 | Hughes | B62D 29/043 296/102 |
| 2009/0056074 | A1 * | 3/2009 | Chase | E05D 7/06 16/321 |
| 2010/0301057 | A1 * | 12/2010 | Tattam | B65D 88/528 220/592.25 |
| 2016/0137039 | A1 * | 5/2016 | Ferrus | B60J 5/0418 49/501 |
| 2016/0325608 | A1 | 11/2016 | Gagas et al. | |
| 2016/0332495 | A1 * | 11/2016 | Franker | B60G 11/48 |
| 2017/0057739 | A1 * | 3/2017 | Kochanowski | B65D 88/524 |
| 2017/0305478 | A1 * | 10/2017 | Regan | B62D 35/001 |
| 2018/0186511 | A1 * | 7/2018 | Sullivan | B65D 7/24 |
| 2019/0061490 | A1 * | 2/2019 | Getzschman | B60J 5/0487 |
| 2019/0352951 | A1 * | 11/2019 | Howson | E05D 5/128 |
| 2020/0207190 | A1 * | 7/2020 | Getzschman | B60J 1/10 |

* cited by examiner 128
104
100
112
108
119
116
114
110

UTILITY VEHICLE HALF DOOR

FIELD OF THE INVENTION

This invention relates to off-road and recreational utility vehicles, and more specifically to a utility vehicle half door.

BACKGROUND OF THE INVENTION

Utility vehicles for off-road and recreational use are capable of carrying a seated driver and one or more seated passengers. These utility vehicles may include one or two rows of seats, and roll over protection structures extending over the seating areas. Additionally, they may require occupant side retention devices to reduce the probability of entrapment of a properly belted occupant's head, upper torso and limbs in the event of a tip-over onto the vehicle's side. Some off-road and recreational utility vehicles include side nets, as shown in U.S. Pat. Nos. 9,061,569 and 9,073,412. Others may include half doors, such as U.S. Pat. No. 9,789,753 and 10246153. Half doors are more costly than side nets. Half doors also may include more parts such as mounting brackets for door release and latching components. A utility vehicle half door is needed that is low in cost and has few parts.

SUMMARY OF THE INVENTION

A utility vehicle half door may be a one piece plastic body having identical exterior and interior surfaces. A modular interior panel may be mounted to the interior surface. The modular interior panel may include an integral armrest, along with a door release handle, a door latch, first and second linkages between the release handle and door latch, a pivot member between the first and second linkages, and a release spring. A plurality of hinge knuckles on an edge of the one piece plastic body may be used to mount the one piece plastic body to either the left or right side of a utility vehicle.

DESCRIPTION OF THE PREFERRED EMBODIMENT

Figure 1:
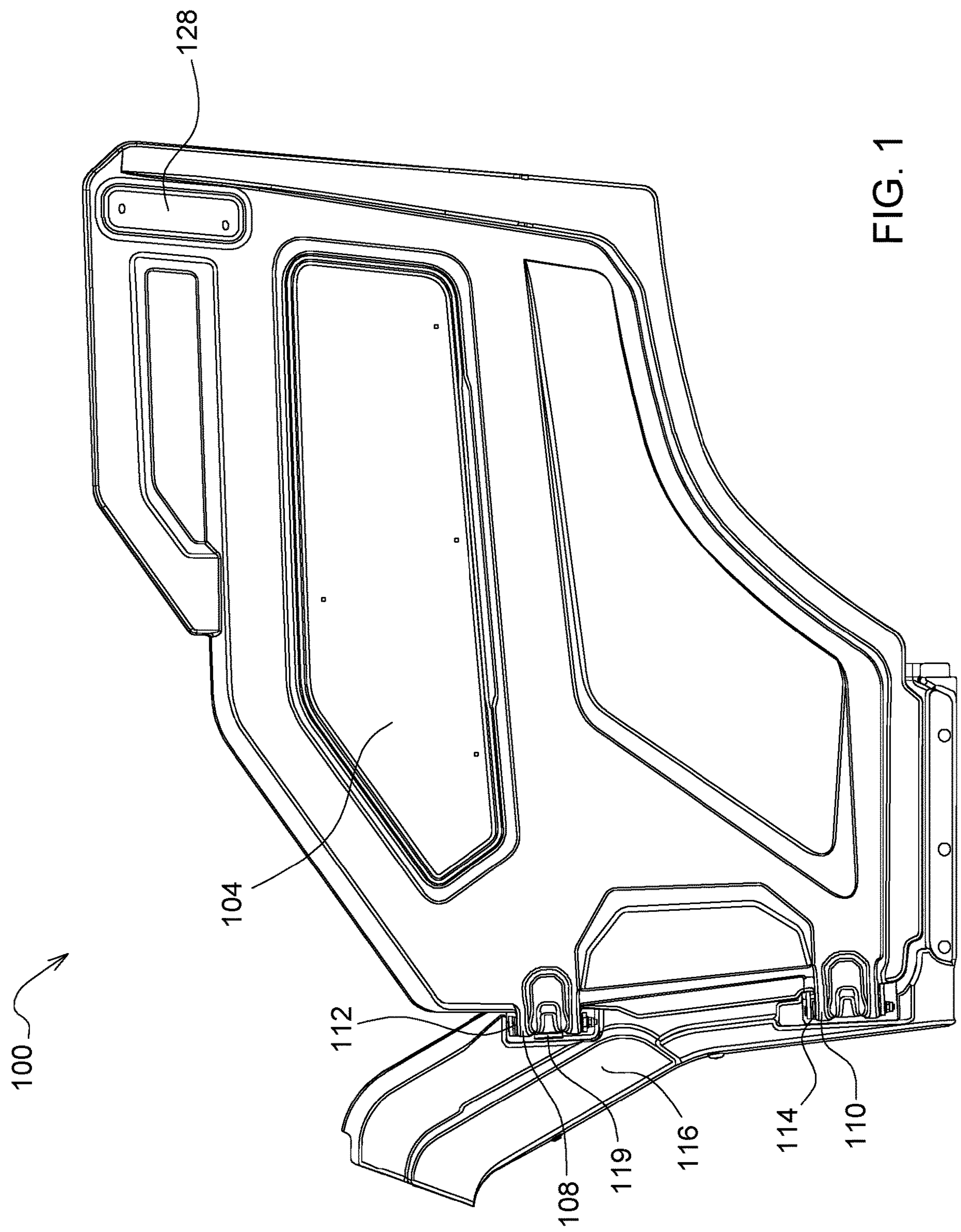
FIG. 1 is a side view of a utility vehicle half door mounted to the left side of an off-road or recreational utility vehicle according to a first embodiment of the invention.
Figure 2:
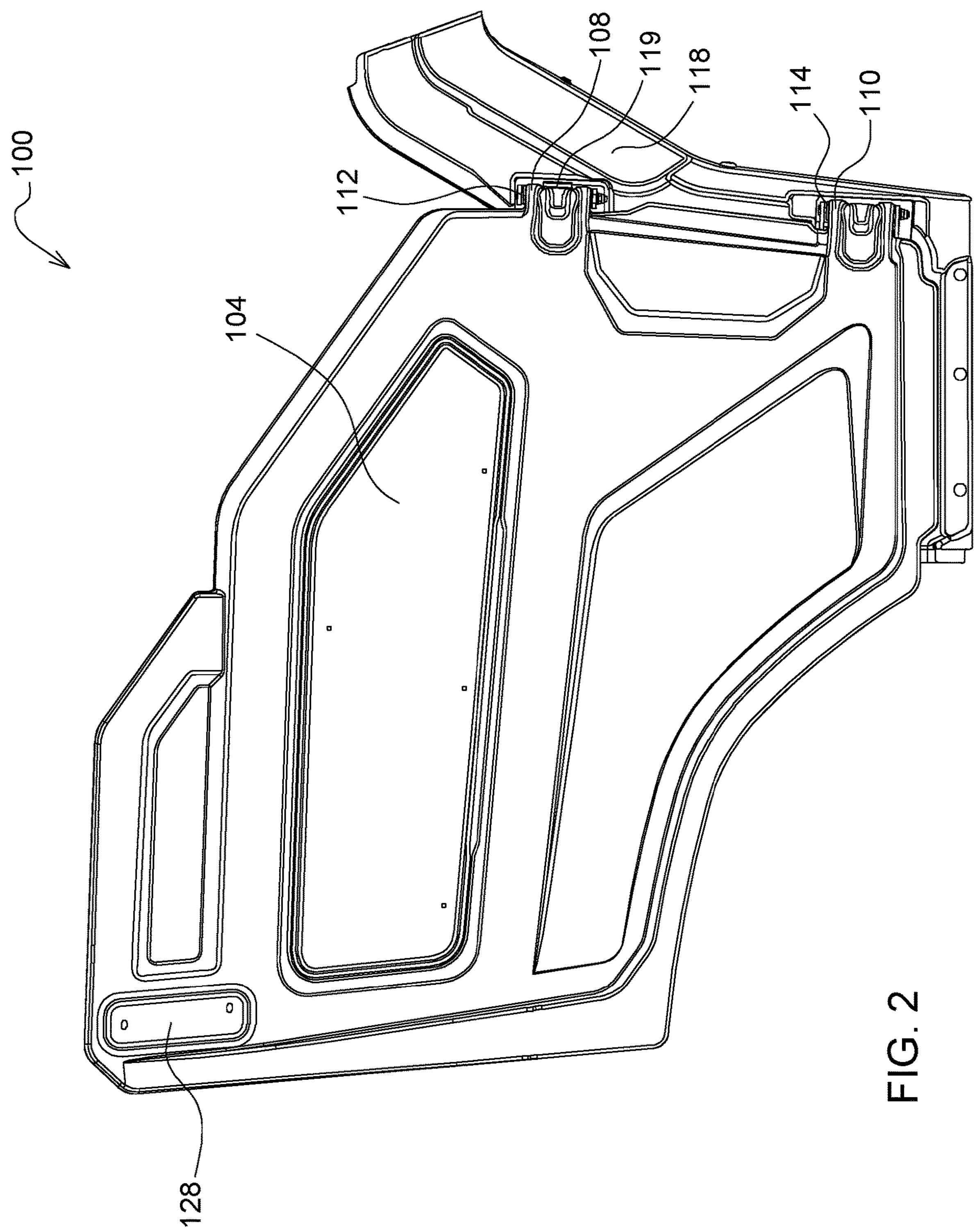
FIG. 2 is a side view of the utility vehicle half door of FIG. 1, mounted to the right side of an off-road or recreational utility according to a first embodiment of the invention.

In one embodiment, utility vehicle half door 100 may be a unitary molded plastic body that is symmetric. The first surface 104 and second surface 106 of the unitary plastic body may be identical. The first and second surfaces may be exterior or interior surfaces. As a result, the same utility vehicle half door may be mounted to the left side of an off-road or recreational utility vehicle as shown in FIG. 1, or the right side of the vehicle as shown in FIG. 2.

In one embodiment, utility vehicle half door 100 may include at least two hinge knuckles, such as upper hinge knuckle 108 and lower hinge knuckle 110. Both upper and lower hinge knuckles may be integral with the unitary molded plastic body. Both upper and lower hinge knuckles may be located on the forward edge of the half door, so that the half door may swing out when it is mounted on either side of the vehicle. For example, upper and lower hinge pins 112, 114 may be inserted through the hinge knuckles and through upper and lower sleeves or retainers on the rear edge of front left fender 116 and front right fender 118 of the utility vehicle. Tab 119 may be provided on at least one of the hinges to stop the door from opening more than about 90 degrees. Additionally, the hinge knuckles may be located on the rear edge of the half door, or a second pair of half doors may be provided on a utility vehicle having a second row of seats. The half doors are shown mounted to fenders, but also may be mounted to a post or frame member.

Figure 3:
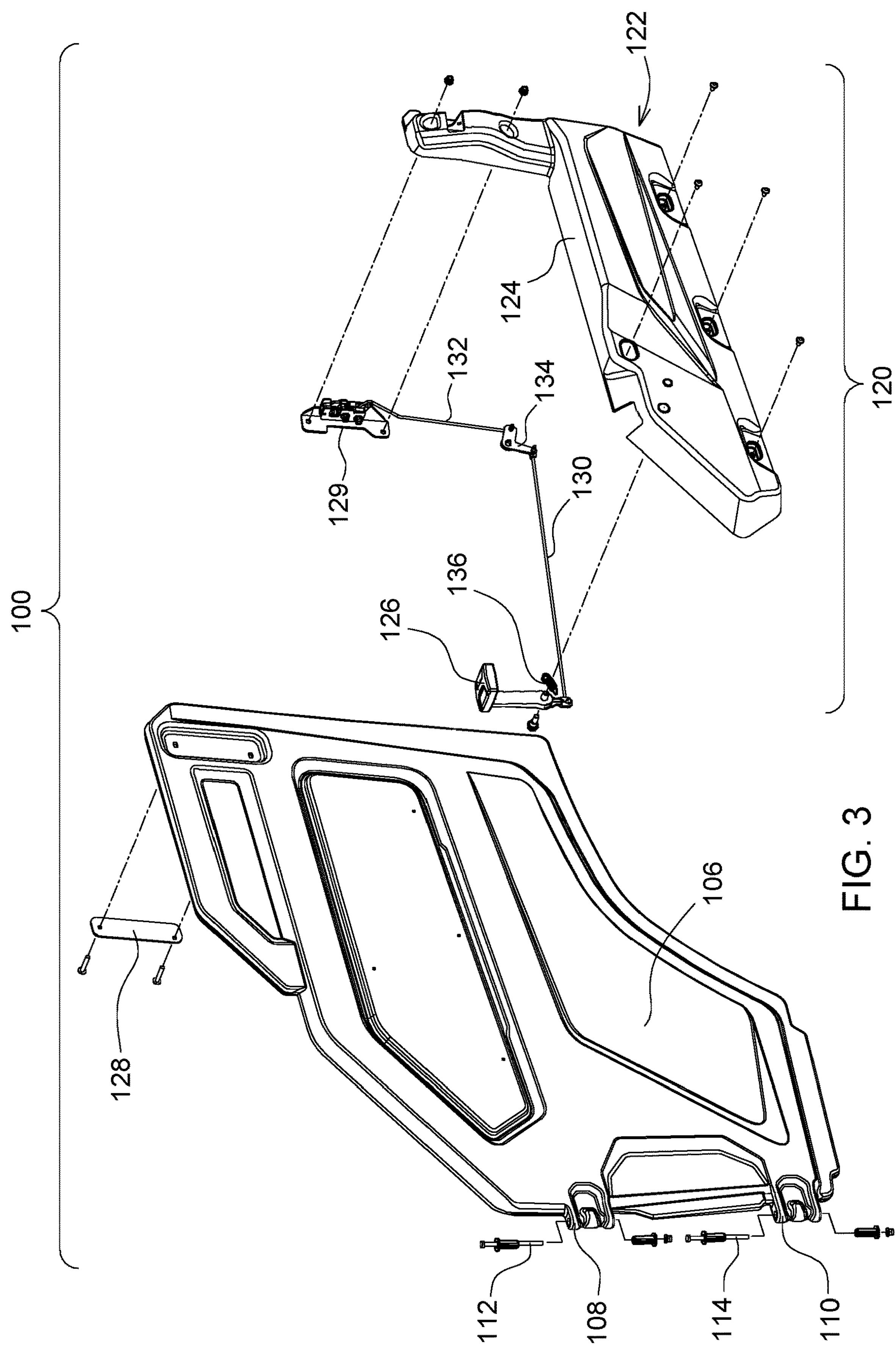
FIG. 3 is an exploded perspective view of the utility vehicle half door of FIGS. 1 and 2 having an interior panel subassembly according to a first embodiment of the invention.

In one embodiment, as shown in FIG. 3, utility vehicle half door 100 may include interior panel subassembly 120. The interior panel subassembly may include interior panel 122 and integrated armrest 124. The interior panel subassembly also may include door release and latching components such as door release handle 126, door latch 129, linkages 130 and 132, pivot member 134, and latch spring 136. Additionally, when the interior panel subassembly is mounted to the utility vehicle half door, cover plate 128 may be attached to the outside surface of the half door to help secure the door latch in position so that it can move rearwardly to engage a latch bolt or rod on the vehicle.

In one embodiment, utility vehicle half door 100 may include modular interior panel subassembly 120. The modular interior panel subassembly, including the door release and latching components listed above, may be assembled to the interior panel before the subassembly is attached to utility vehicle half door 100. Clips or threaded fasteners 138 may be used to attach the interior panel subassembly to the interior surface of the utility vehicle half door. The clips or threaded fasteners may be inserted through the interior panel subassembly and may engage holes in the interior surface of the half door. The interior panel subassembly also may eliminate any need for mounting brackets on a utility vehicle half door for door release or latching components.

Having described the preferred embodiment, it will become apparent that various modifications can be made without departing from the scope of the invention as defined in the accompanying claims.

The invention claimed is:

1. A utility vehicle half door, comprising:

a unitary molded plastic body that is symmetrical and identical on both a first surface and second surface; and a plurality of hinge knuckles integral with the unitary molded plastic body for hinged mounting to a left side of a utility vehicle or a right side of a utility vehicle.

2. The utility vehicle half door of claim 1 further comprising an interior panel subassembly attached to one of the first and second surfaces.

3. The utility vehicle half door of claim 2 wherein the interior panel subassembly includes an integrated armrest.

4. The utility vehicle half door of claim 2 wherein the interior panel subassembly includes a door release handle and a door latch.

5. A utility vehicle half door, comprising:

a plastic body that is symmetric and mounted with hinges on an edge thereof to a side of a utility vehicle; and a modular interior panel attached to a surface of the plastic body; the modular interior panel including an integral armrest, a door release handle and a door latch.

6. The utility vehicle half door of claim 5 further comprising a plurality of hinge knuckles that are integral with the plastic body.

7. The utility vehicle half door of claim 5 wherein the plastic body is mounted with hinges to a rear edge of a fender of the utility vehicle.

8. The utility vehicle half door of claim 5 wherein the modular interior panel is attached to the surface of the plastic body without mounting brackets.

9. A utility vehicle half door, comprising:

a one piece plastic body having identical exterior and interior surfaces;

a modular interior panel mounted to the interior surface; the modular interior panel including a door release handle, a door latch, a first linkage and a second linkage between the release handle and the door latch, a pivot member between the first and second linkages, and a release spring; and a plurality of hinge knuckles on an edge of the one piece plastic body for mounting the one piece plastic body to either the left side or right side of a utility vehicle.

10. The utility vehicle half door of claim 9 further comprising a plate on the outside surface secured to the modular interior panel.

11. The utility vehicle half door of claim 9 wherein the plurality of hinge knuckles are integral with the one piece plastic body.

* * * * *